Feb. 13, 1923.
C. A. RIVERS ET AL
1,445,105
CHARGE CONDITIONING DEVICE FOR GAS ENGINES
Original Filed Oct. 28, 1918
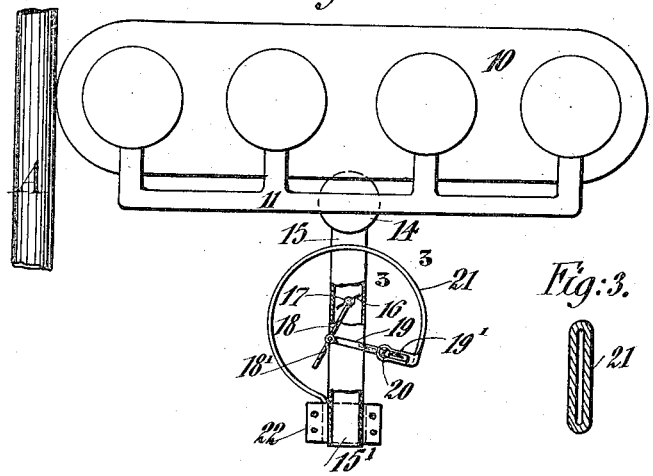
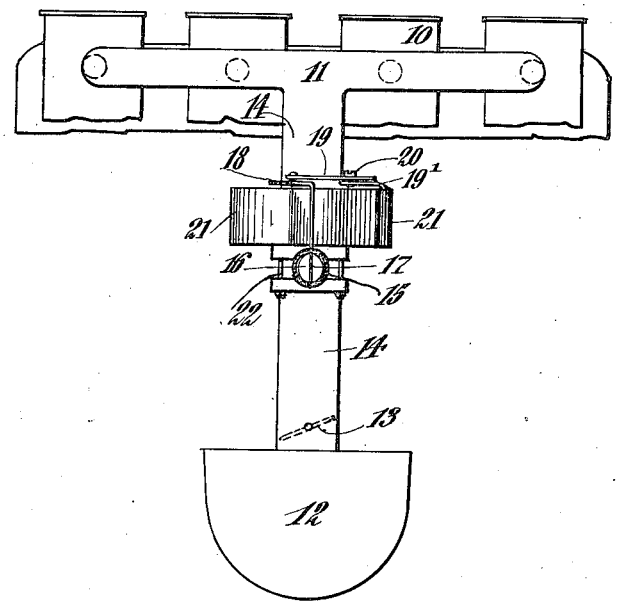
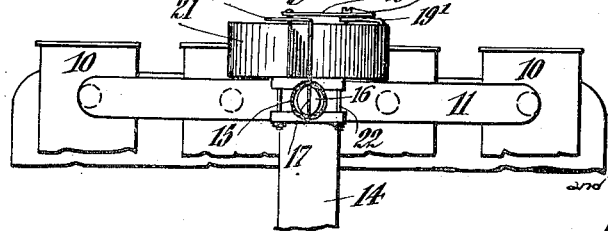
INVENTORS
Charles A. Rivers
and Francis B. Stuart
BY E. P. Goepel
ATTORNEY Patented Feb. 13, 1923.

1,445,105

UNITED STATES PATENT OFFICE.

CHARLES A. RIVERS AND FRANCIS B. STUART, OF EL PASO, TEXAS; ARA M. RIVERS ADMINISTRATRIX OF SAID CHARLES A. RIVERS, DECEASED.

CHARGE-CONDITIONING DEVICE FOR GAS ENGINES.

Application filed October 28, 1918, Serial No. 259,976. Renewed April 26, 1922. Serial No. 556,567.

*To all whom it may concern:*

Be it known that we, CHARLES A. RIVERS and FRANCIS B. STUART, both citizens of the United States, and residents of El Paso, in the county of El Paso and State of Texas, have invented certain new and useful Improvements in Charge-Conditioning Devices for Gas Engines, of which the following is a specification.

Our invention relates to apparatus driven by internal combustion engines and particularly to airplanes which, as is well known, are operated under widely varying conditions of atmospheric pressure. Considerable difficulty has been experienced with such apparatus particularly at high altitudes on account of the fact that the same volume of air will contain a much smaller proportion of oxygen at a high altitude than it does at a low altitude, and internal combustion engines as generally constructed at present have a regulating device which admits air and in it oxygen, in varying volume according to the suction produced by the engine, but does not take into account the fact mentioned above that the same volume of air does not always contain the same amount of oxygen, and of course it is the amount of oxygen contained in the combustion charge or working charge which is of importance in the operation of the engine, and not simply the volume of air. Starting from these considerations we have devised an apparatus which includes a device responsive to changes of atmospheric pressure and also includes an engine regulator controlled by said device. More specifically the engine regulator is constructed to vary the relative volumetric proportion of air and fuel in the working charge in such a manner that the charge will receive a relatively large volume of air when atmospheric pressure is low, and a relatively small volume of air when atmospheric pressure is high. In the preferred embodiments of our invention as disclosed in the accompanying drawings the regulator is arranged to vary the admission of auxiliary air supplied to the working charge between the carburetor and the engine in such a manner that under otherwise equal conditions a larger volume of atmospheric air will be admitted at this point when the pressure is relatively low (that is to say, in the case of airplanes, dirigibles, or other power-driven aircraft, at high altitudes) than when the pressure is relatively high.

Reference is to be had to the accompanying drawings in which Fig. 1 is a diagrammatic plan view of an airplane provided with our improvement; Fig. 2 is a corresponding elevation; Fig. 3 is a detail section taken on line 3—3 of Fig. 1; and Fig. 4 is a diagram showing a slightly different form of our invention.

The airplane, a portion of which is indicated at A, is provided with an internal combustion engine 10 of any suitable construction for driving the propelling mechanism; 11 indicates the intake manifold of the engine; 12 the carburetor with the usual throttle valve 13; 14 the connection from the carburetor to the manifold, and 15 a lateral connection or trunk leading to the connection 14 and open to the atmosphere at its free end 15', constituting an auxiliary air inlet of a type employed in many engines. This auxiliary air inlet is controlled by a valve 16, pivoted at 17 and provided on its pivot with a crank arm 18 having a series of apertures 18' at different distances from the pivot. At any one of these openings the crank arm 18 may be connected with an actuating link preferably made expansible as by constructing it of two sections 19—19' adapted to slide lengthwise of each other and to be secured in the adjusted position by suitable means such as a clamping screw 20. The other end of the link 19—19' is connected operatively with a device responsive to changes of atmospheric pressure. This device may consist of an elastic metal casing 21 in the nature of a thin flat curved tube (Fig. 3), expansible and contractible in response to decrease or increase respectively of the atmospheric pressure, that is to say, the casing will tend to straighten out as pressure rises, and to contract or become more strongly curved with falling pressure. One end of this casing is stationary relatively to the frame of the airplane, say by being secured to the pipe or trunk 14 by means of a clamp 22.

It will be evident that as an airplane rises from the ground to a high altitude the expansible casing 21 will tend to expand for the reason that the pressure on its outside is diminished whereas the amount of air or other contents of the casing remains the same, it being understood that the casing is air-tight so that the surrounding air has no access to the interior of the casing. This will cause the casing 21 to "straighten out" or become less curved. Therefore, as the airplane rises the valve 16 will be shifted and the connections are such that under the conditions just assumed the valve will be opened more widely; thus even assuming that there is no change in the suction produced by the engine, the wider opening of the auxiliary air valve will cause the volume of auxiliary air to be increased and will thus compensate for the fact that at high altitudes a given volume of air contains less oxygen than the same volume contains at low altitudes. Similarly when the airplane descends the valve will be operated in the opposite direction, that is to say, it will be caused to move towards the closed position thus reducing the volume of auxiliary air admitted.

While we have designed our invention particularly for use in connection with airplanes, it will be obvious that it might be applied to other apparatus as well, for instance, to automobiles, and there may be cases where the application to motor cars would be especially desirable, say when a motor car is to be operated largely in mountainous regions where considerable changes of level or altitude take place frequently.

In Fig. 4 we have indicated that the auxiliary air inlet might be located directly upon the manifold. This may be preferable on account of the beneficial result of admitting the auxiliary air at as small a distance as possible from the engine cylinders but the operation and advantages of this form of our invention will be otherwise the same as described above.

The link is made expansible in order that the apparatus may be applied readily to an airplane or other structure since this construction of the link will enable the casing 21 to be placed at different distances from the valve according to individual requirements. By connecting the link with the crank on the valve pivot at different distances from the pivot, we are enabled to vary not only the normal position of the valve but the extent of angular movement that will be imparted to said valve by a given longitudinal movement of the actuating link.

While we prefer to make the casing 21 elastic, this is not essential, it being sufficient that the casing shall be expansible or contractible, so that a portion of such casing will move in response to changes of atmospheric pressure, it being understood that another portion of the casing is fixed or immovable relatively to the frame of the airplane or other apparatus. The particular form of casing illustrated herein is of special advantage in that it is affected but little by changes of temperature, which is an important consideration, since the fall in atmospheric pressure due to the rising of an airplane or the like to high altitudes is generally accompanied by a fall in temperature, the influence of which might disturb the effect to the change in pressure.

While we have described satisfactory and preferred embodiments of our invention, we desire it to be understood that modifications may be made without departing from the spirit of our invention as defined in the appended claims.

We claim:

1. In combination with an internal combustion engine having charge supply means, a device for regulating the quantity of an auxiliary supply of air to the working charge in inverse ratio to the atmospheric pressure.

2. In combination with an internal combustion engine, a device responsive to changes of atmospheric pressure, and a regulator, controlled by said device, and arranged to vary the relative volumetric proportion of air and fuel in the working charge in such a manner that the charge will receive a relatively large volume of air when atmospheric pressure is low, and a relatively small volume of air when atmospheric pressure is high.

3. In combination with an internal combustion engine having charge supply means, a device for regulating the quantity of an auxiliary supply of air to the working charge independently of the charge supply means and in inverse ratio to the atmospheric pressure.

4. In combination with an internal combustion engine, and a carburetor therefor, an auxiliary inlet for supplying additional air to the working charge between the carburetor and the engine, a valve controlling said auxiliary inlet, a device responsive to changes of atmospheric pressure, and an operative connection between said device and said valve to open said valve to a greater extent when such pressure decreases and to cause the valve to move toward the closed position as atmospheric pressure increases.

5. In combination with an internal combustion engine and a carburetor therefor, an auxiliary inlet for supplying additional air to the working charge between the carburetor and the engine, a valve controlling said auxiliary air inlet, an elastic casing expansible and contractible in response to changes of atmospheric pressure, and an operative connection between said casing and said valve to open the latter to a greater extent when such pressure falls and to cause the valve to move toward the closed position as atmospheric pressure increases.

6. In combination with an internal combustion engine having charge supply means, a device for regulating the quantity of an auxiliary supply of air to the working charge in inverse ratio to the atmospheric pressure, said device including means whereby the volume of air supplied to the charge at different atmospheric pressures may be predetermined.

7. In combination with an internal combustion engine having charge supply means, means for regulating the quantity of an auxiliary supply of air to the working charge in inverse ratio to the atmospheric pressure including an air supply valve and an extensible and contractible element responsive to changes in atmospheric pressure operatively connected to said valve.

8. In combination with an internal combustion engine having a manifold, a device having a portion movable in response to changes of atmospheric pressure, but relatively indifferent to changes of temperature, and a regulator for the manifold of said engine, controlled by the movement of said portion and being independent of the action of the fuel supply valve.

9. In apparatus of the class described an internal combustion engine, a closed airtight metal tube of flat cross-section and longitudinal curvature having a relatively stationary portion and a portion free to bend or unbend in response to changes of atmospheric pressure and a regulator for the manifold of said engine controlled by the movement of said tube and being independent of the fuel supply valve.

10. In combination with an internal combustion engine having charge supply means and a manifold, said manifold being provided with a port directly communicating with the atmosphere; a device for regulating the quantity of an auxiliary supply of air to the working charge in inverse ratio to the atmospheric pressure, said device including a valve controlling the inlet of air through said port, and an expansible and contractible element mounted upon the manifold and susceptible to changes in atmospheric pressure and operatively connected to said valve.

11. In combination with an internal combustion engine having an intake manifold and a carbureter adapted to prepare and deliver a charge to said manifold, of an auxiliary air inlet for introducing additional air to the prepared charge in its passage from the carbureter to the engine, a valve controlling the inlet of such additional air, and means coupled to said valve and adapted to be acted on by the barometric pressure to open and close the valve to correspond respectively with decreases and increases in the atmospheric pressure.

12. In combination with an internal combustion engine and a carbureter for preparing an explosive charge therefor, of an auxiliary air intake arranged to deliver additional air to the charge on its way from the carbureter to the engine, a butterfly valve in said auxiliary air intake, an arm on said valve, a flat tube bent into partial circular form and secured at one end, an adjustable link connecting the free end of said tube with said arm, said tube being expansible and contractile and containing fluid adapted to be acted on by the barometric pressure to cause the expansion and contraction of the tube whereby the butterfly valve may be opened and closed in accordance with the barometric pressure.

13. A device for use in conjunction with airplane motors comprising in combination with a motor having a charge inlet in communication with a charge preparing device and an air intake from the atmosphere to said charge inlet, a rotary valve in said air inlet for governing the port area and controlling the volume of air passing to the motor, and a volute device expansible under varieties in altitude conditions coupled to said rotary valve and acting to increase the port area as rarer atmospheres are reached in proportion to the rarity of the atmosphere.

14. A device for use in airplanes comprising in combination with an airplane motor having a charge intake in communication with a charge preparing device and having an air inlet leading to the charge intake, of valve means in the air inlet for controlling the volume of air passing to the charge, a volute flat tube having one end secured to a fixed object and having therein a fluid under pressure to cause changes in the curvature of the tube under various conditions of rarity or density in the atmosphere, and an adjustable means coupled between said valve means and the free movable end of said volute tube for communicating the movement of the tube to said valve means whereby the valve means will increase the port area of the valve means in direct proportion to the rarity of the atmosphere.

In testimony that they claim the foregoing as their invention, they have signed their names hereunder.

CHARLES A. RIVERS.
FRANCIS B. STUART.